UNITED STATES PATENT OFFICE.

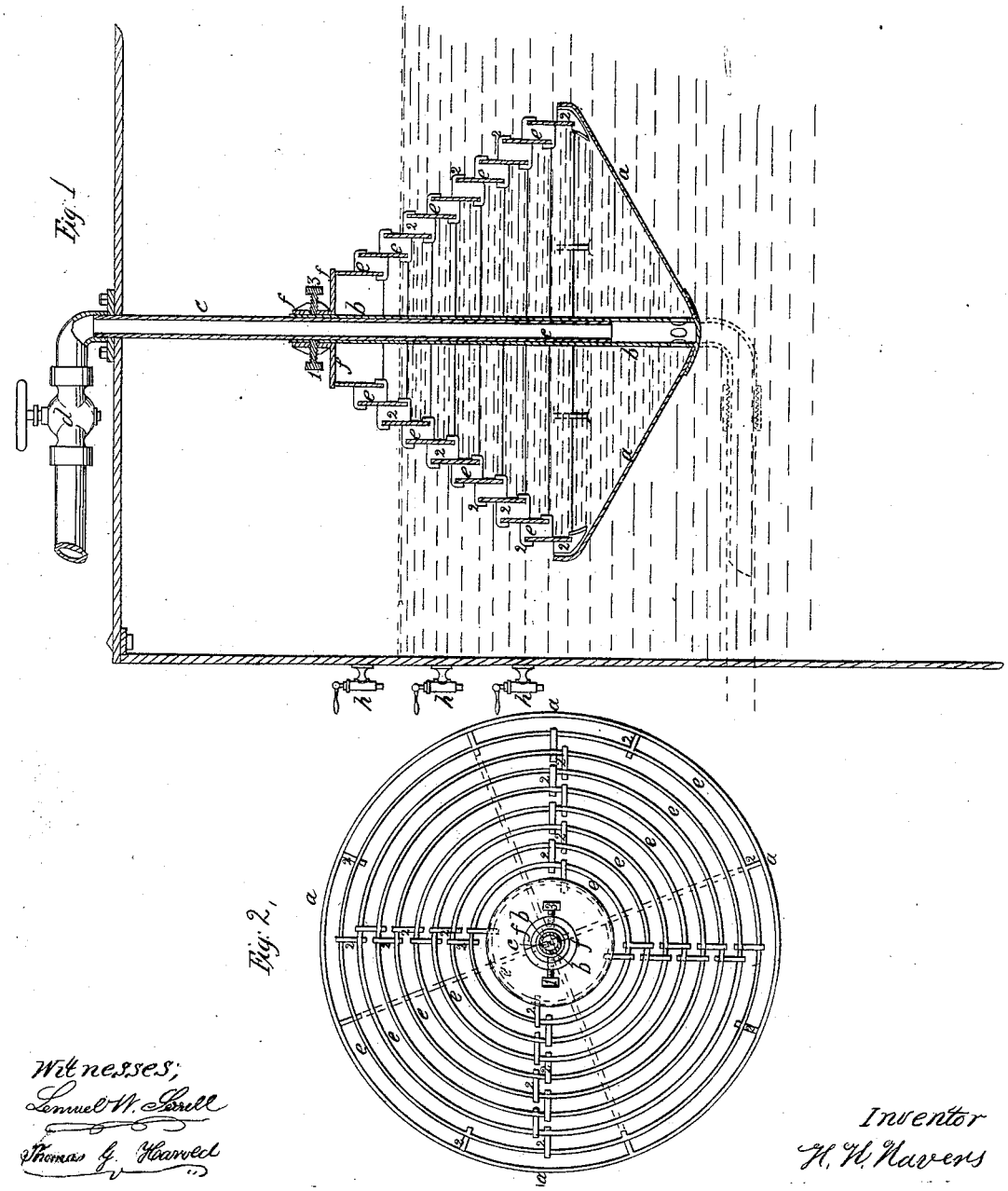

HIRAM H. HAVENS, OF NEW YORK, N. Y.

IMPROVED SEDIMENT-COLLECTOR FOR STEAM-BOILERS.

Specification forming part of Letters Patent No. 22,178, dated November 30, 1858.

*To all whom it may concern:*

Be it known that I, HIRAM H. HAVENS, of the Island of Cuba, now in the city and State of New York, and a citizen of the United States, have invented, made, and applied to use a certain new and useful Improvement in Sediment-Collectors for Steam and other Boilers; and I do hereby declare that the following is a full, clear, and exact description of the construction and operation of the same, reference being had to the annexed drawings, making part of this specification, wherein—

Figure 1 is a vertical section, and Fig. 2 is a plan, of my sediment-collector.

Similar marks of reference denote the same parts.

In steam and other boilers the impurities contained in the water which is supplied to the same produce a deposit which adheres to the sides and other internal parts, obstructing the transmission of heat from the fire to the water, and also causing the boiler itself to burn out. This sediment is the greatest in amount where the water is comparatively quiescent, and I have found by experiment that almost all sediment first rises to the surface and then collects on and adheres to the parts with which it comes in contact. Availing of these two points, I have devised an apparatus for collecting the sediment at or near the surface of the water in a vessel that retains water in a comparatively quiescent state, and for this purpose I make use of any suitable pan or conical vessel, $a$, formed of one or more pieces for convenience in handling, and of a size adapted to the boiler with which it is used. This vessel is sustained with its upper edge below the lowest water-line of the boiler and has a pipe, $b$, connected with its lowest portion and passing out above the boiler, as shown at $c$, where a cock, $d$, is provided, by the opening of which the sediment and water contained in said vessel $a$ will be blown out by the pipe $b$ $c$ as often as necessary, or said pipe $b$ might be conveyed downward or off horizontally, as shown by dotted lines in Fig. 1. If the water always remained at exactly one level and the vessel $a$ were located just below the surface, the ebullition would throw any sediment over the edge into the quiescent water and the same would settle down in the said vessel; but inasmuch as the water-line is constantly varying I make use of a cone of rings, $e\ e$, placed successively within and rising higher than the preceding one, and by this means there is a constant circulation maintained through the apparatus in consequence of the ebullition, and the water is retained in a comparatively quiescent state, and any sediment thrown into the rings at any point subsides into the vessel $a$, and is blown out thereof, as before set forth.

For the purpose of adjusting the apparatus to the desired height in the boiler, I have shown the pipe $c$ as within the pipe $b$, and a set-screw, 1, to bind the two together. The rings $e\ e$, I have shown as kept apart and supported by plates 2 2, hooking successively above one plate and below the next, so as to connect and keep the rings or hoops $e\ e$ in place, and $f$ is a cap-plate attached to the pipe $b$ by the screw 3 to keep the rings down in place.

In marine boilers suitable divisions may be introduced, as shown in Fig. 1 by dotted lines, extending from the rings $e\ e$ to the bottom of the pan $a$, to lessen the motion of the water in said pan when the vessel is rolling. It will be apparent that this arrangement of devices might be varied and put into a square oblong or other form adapted to the circumstances, so long as the blow-off vessel $a$ and hoops, slats, or similar edges and openings are provided, over which the ebullition throws the impurities in the manner specified when the water is at any point between its highest or lowest gage.

$h\ h$ are gage-cocks.

And it will be further apparent that the rings or hoops $e$, or their equivalents, may be sections of cylinders, as shown, or sections of inverted cones or pyramids, and be placed in a vertical or more or less conical position above the vessel $a$, so long as they present alternate horizontal edges and openings receiving the sediment thrown over by the ebullition.

I do not claim a vessel and blow-cock in which there are vertical openings, as these have been used and do not collect the sediment by the ebullition throwing the same over horizontal edges.

I am also aware that a dish or horizontal vessel has been located below the surface of the water to receive the ebullition, and therefore I do not claim the same; but in this instance no provision was made for a variation in the change of water-level, and unless the alternate edges and openings rise above the water and are so formed that scum or sediment once thrown over by the ebullition cannot escape the object sought will not be accomplished.

What I claim as my invention, and desire to secure by Letters Patent, is—

The vessel $a$, fitted with a blow-off pipe, in combination with the rings $e\ e$, or their equivalents, presenting alternate horizontal edges and openings from the highest to the lowest water gage or level, for the purposes and as specified.

In witness whereof I have hereunto set my signature this 16th day of August, 1858.

H. H. HAVENS.

Witnesses:
LEMUEL W. SERRELL,
THOMAS G. HAROLD.